US010788447B2

(12) United States Patent
Nakayama et al.

(10) Patent No.: US 10,788,447 B2
(45) Date of Patent: Sep. 29, 2020

(54) LIQUID ANALYZER AND LIQUID ANALYSIS SYSTEM

(71) Applicants: TOKYO METROPOLITAN GOVERNMENT, Tokyo (JP); HORIBA, Ltd., Kyoto-shi, Kyoto (JP); HORIBA Advanced Techno, Co., Ltd., Kyoto-shi, Kyoto (JP)

(72) Inventors: Akio Nakayama, Tokyo (JP); Rumiko Furuya, Tokyo (JP); Akio Ishii, Kyoto (JP); Yasuto Kaba, Kyoto (JP); Yuichi Ito, Kyoto (JP); Susumu Yamauchi, Kyoto (JP); Hiroaki Murakami, Kyoto (JP); Atsushi Senda, Kyoto (JP)

(73) Assignees: HORIBA ADVANCED TECHNO CO., LTD., Kyoto-Shi, Kyoto (HK); HORIBA, LTD., Kyoto-Shi, Kyoto (JP); TOKYO METROPOLITAN GOVERNMENT, Tokyo (JP)

(*) Notice: Subject to any disclaimer, the term of this patent is extended or adjusted under 35 U.S.C. 154(b) by 49 days.

(21) Appl. No.: 15/529,001

(22) PCT Filed: Nov. 26, 2015

(86) PCT No.: PCT/JP2015/083225
§ 371 (c)(1),
(2) Date: May 23, 2017

(87) PCT Pub. No.: WO2016/084894
PCT Pub. Date: Jun. 2, 2016

(65) Prior Publication Data
US 2017/0322178 A1    Nov. 9, 2017

(30) Foreign Application Priority Data
Nov. 26, 2014  (JP) .................... 2014-238341

(51) Int. Cl.
*G01N 27/416* (2006.01)
(52) U.S. Cl.
CPC ....... *G01N 27/4161* (2013.01); *G01N 27/416* (2013.01)
(58) Field of Classification Search
CPC ............ G01N 27/4161; G01N 27/416; G01N 27/333-38; G01N 27/4163;
(Continued)

(56) References Cited

U.S. PATENT DOCUMENTS

| 3,835,011 | A | * | 9/1974 | Baum et al. | ....... G01N 27/3335 204/418 |
| 4,285,792 | A | * | 8/1981 | McGandy | ............... G01N 27/38 204/402 |
| 2016/0054257 | A1 | * | 2/2016 | Ishige | .................. G01N 27/333 205/789 |

FOREIGN PATENT DOCUMENTS

| JP | S52012893 A | 1/1977 |
| JP | S53147594 A | 12/1978 |

(Continued)

OTHER PUBLICATIONS

Machine translation to English of JP 2001-235443 A (Year: 2001).*
(Continued)

*Primary Examiner* — J. Christopher Ball
(74) *Attorney, Agent, or Firm* — Alleman Hall Creasman & Tuttle LLP (57) ABSTRACT

A liquid analyzer is one that performs analysis in a state of being immersed in a flowing analysis target liquid, and in order to simply make a good/bad determination and increase reliability, includes: a sensor adapted to, in a state where a responsive membrane is immersed in the flowing analysis target liquid, sense a predetermined component contained in the analysis target liquid; an analysis mechanism adapted to analyze the analysis target liquid with use of voltage gen-
(Continued)

erated in the sensor; and a resistance measurement mechanism adapted to, in the state where the responsive membrane is immersed in the flowing analysis target liquid, apply DC voltage to the responsive membrane to measure the resistance of the responsive membrane.

8 Claims, 8 Drawing Sheets

(58) Field of Classification Search
CPC .......... G01N 27/4165; G01N 27/4166; G01N 27/4167; G01N 27/33–335
See application file for complete search history.

(56) References Cited

FOREIGN PATENT DOCUMENTS

| JP | 2001235443 A | 8/2001 |
|---|---|---|
| JP | 2003207481 A | 7/2003 |
| JP | 2007278496 A | * 10/2007 |
| JP | 2009092414 A | 4/2009 |
| JP | 2010060377 A | 3/2010 |
| JP | 2014219246 A | 11/2014 |

OTHER PUBLICATIONS

U. Oesch, et al. "Ion-Selective Membrane Electrodes for Clinical Use", Clinical Chemistry, 32(8): p. 1448-1459, August (Year: 1986).*

ISA Japan Patent Office, International Search Report Issued in Application No. PCT/JP2015/083225, dated Jan. 26, 2016, WIPO, 4 pages.

Ishi A. et al., "Ammonia Nitrogen Monitor HC-200NH," Readout, No. 43, Oct. 31, 2014, pp. 33-37.

Japanese Patent Office, Office Action Issued in Application No. 2016561941, dated Jun. 13, 2019, 8 pages.

* cited by examiner

LIQUID ANALYZER AND LIQUID ANALYSIS SYSTEM

TECHNICAL FIELD

The present invention relates to a liquid analyzer that, in a state of being immersed in a flowing analysis target liquid, analyzes the analysis target liquid, and to a liquid analysis system.

BACKGROUND ART

For example, for a water quality test of sewage water, a liquid analyzer adapted to measure the amount of ammonium ions contained in wastewater as an analysis target liquid is available. The liquid analyzer analyzes ammonium concentration by measuring a voltage generated in a sensor in a state of being immersed in the wastewater.

Meanwhile, the above-described liquid analyzer deteriorates with time, and therefore as operating time becomes longer, accurate measurement becomes difficult to perform, thus reducing reliability.

For this reason, as a liquid analyzer having improved reliability, there is one described in, for example, Patent Literature 1. This liquid analyzer is such that an electrolyte liquid is put into a sample tube in place of a sampled analysis target liquid to, for example, measure the resistance of a responsive membrane provided in a sensor, and from the resistance, it is determined whether the sensor and the liquid analyzer are good. Note that the reason to use the electrolyte liquid in place of the analysis target liquid may be to prevent the resistance of the analysis target liquid itself from being added to the resistance of the responsive membrane to thereby fail to accurately measure the resistance of the responsive membrane.

CITATION LIST

Patent Literature

Patent Literature 1: JP-A2003-207481

SUMMARY OF INVENTION

Technical Problem

However, applying the configuration of Patent Literature 1 adapted to use the electrolyte liquid for measuring the resistance of the responsive membrane to the liquid analyzer adapted to be immersed in the flowing analysis target liquid for analysis requires significant time and effort of, in order to measure the resistance of the responsive membrane, taking the trouble to pull up the sensor from the analysis target liquid, immerse the sensor into the electrolyte liquid to determine whether the sensor is good, and further return the sensor into the analysis target liquid.

The present invention is one that analyzes a flowing analysis target liquid in consideration of the above problem, and a main object thereof is to provide a liquid analyzer, liquid analysis apparatus, and liquid analysis system capable of determining whether a sensor is good without taking time and effort and increasing the reliability of an analysis result.

Solution to Problem

The liquid analyzer according to the present invention is a liquid analyzer that analyzes a flowing analysis target liquid, and includes: a sensor adapted to, in a state where a responsive membrane is immersed in the flowing analysis target liquid, sense a predetermined component contained in the analysis target liquid; an analysis mechanism adapted to analyze the analysis target liquid with use of voltage generated in the sensor; a resistance measurement mechanism adapted to, in the state where the responsive membrane is immersed in the flowing analysis target liquid, apply DC voltage to the responsive membrane to measure the resistance of the responsive membrane; and a control part adapted to control the analysis mechanism and the resistance measurement mechanism.

In such an analyzer, since the resistance measurement mechanism is configured to, in the state where the responsive membrane is immersed in the flowing analysis target liquid, measure the resistance of the responsive membrane, it is not necessary to take the trouble to pull up the sensor from the flowing analysis target liquid for determining whether the sensor is good, and immerse the sensor in another electrolyte liquid. Accordingly, the time and effort required to determine whether the sensor is good can be greatly reduced.

In addition, the responsive membrane immersed in the flowing analysis target liquid obtains sufficiently large resistance as compared with the resistance of the analysis target liquid itself by being configured to be resistant to disturbance such as air bubbles, vibration, impurities, and the like in the analysis target liquid. When the membrane resistance is high as described, it takes time until current flows, and in the case of AC voltage, it is difficult to read a resistance value before voltage switches. On the other hand, in the present invention, since the resistance measurement mechanism applies the DC voltage, even when the membrane resistance is high, i.e., even in the case of the membrane resistance of the responsive membrane immersed in the flowing analysis target liquid, a resistance value can be measured.

As one specific embodiment of the liquid analyzer according to the present invention, one in which after the resistance measurement mechanism has measured the resistance of the responsive membrane, the control part provides a discharge period to discharge an electric charge supplied by the DC voltage applied to the responsive membrane can be cited.

As described above, when applying the DC voltage to the responsive membrane, polarization occurs, and accurate analysis may be prevented at the time of the analysis of the analysis target liquid.

However, in the liquid analyzer according to the present invention, since after the resistance measurement mechanism has measured the resistance of the responsive membrane, the control part sets the discharge period to discharge the electric charge supplied by the DC voltage applied to the responsive membrane, the electric charge stored in the responsive membrane can be discharged to prevent the occurrence of polarization during that predetermined time.

As another specific embodiment of the liquid analyzer according to the present invention, one in which the control part activates the resistance measurement mechanism in a state of stopping the analysis mechanism or keeping analysis result data indicating an analysis result of the analysis by the analysis mechanism, and when the discharge period has passed after stopping the resistance measurement mechanism, cancels the stop of the analysis mechanism or the keeping state can be cited.

By configuring as described above, when the analysis mechanism performs the analysis, the effect of the voltage applied to the responsive membrane by the resistance measurement mechanism can be prevented, and without affecting the analysis result by the liquid analyzer, it can be determined whether the liquid analyzer is good.

As another specific embodiment of the liquid analyzer according to the present invention, one in which the resistance measurement mechanism measures the resistance of the responsive membrane multiple times a day can be cited.

In doing so, for example, by setting a value obtained by averaging values resulting from the multiple times of measurement as the resistance of the responsive membrane, an error depending on measurement time can be eliminated to ensure the determination of the deterioration of the liquid analyzer.

As another specific embodiment of the liquid analyzer according to the present invention, wherein multiple sensors are provided, and at least one of them is in a state where a responsive membrane is not immersed in the flowing analysis target liquid, one further including: a determination part adapted to determine whether the resistance of the responsive membrane measured by the resistance measurement mechanism is equal to or more than a predetermined threshold value; and a sensor switching mechanism adapted to, when the determination part determines that the resistance of the responsive membrane is equal to or more than the threshold value, change the sensor in the state where the responsive membrane is not immersed in the analysis target liquid into an immersed state can be cited.

Such a configuration makes it possible to, for example, automatically replace a sensor having reduced sensitivity due to an increase in the resistance of a responsive membrane, and time and effort for maintenance can be reduced.

As another specific embodiment of the liquid analyzer according to the present invention, one in which the responsive membrane has double membrane structure, and the outer membrane is configured to be peelable can be cited.

Such a configuration makes it possible to, when the outer responsive membrane deteriorates, peel off it, use the inner responsive membrane, which does not deteriorate much, to restore sensitivity again, and continue the analysis.

As the liquid analysis apparatus according to the present invention, one including: the liquid analyzer according to the present invention; a liquid analyzer support part adapted to support the liquid analyzer so as to immerse the fore end part of the liquid analyzer in the analysis target liquid; a cleaning mechanism adapted to remove dirt attached to a part of the sensor immersed in the analysis target liquid; and a display part adapted to display a measurement value outputted from the liquid analyzer can be cited.

In such an apparatus, the amount of a predetermined component contained in the analysis target liquid is easily monitored at a measurement site, and even when the analysis target liquid is one containing a large amount of dirt components, such as sewage water, the performance of the sensor can be kept normal over a long term.

In addition, the liquid analysis system according to the present invention includes: a liquid analysis apparatus that includes the liquid analyzer according to the present invention and at a first analysis site at which the analysis target liquid flows, analyzes the analysis target liquid in the state where the responsive membrane is immersed in the analysis target liquid; and an external device including a data acquisition part adapted to, at a second analysis site different from the first analysis site, acquire auxiliary analysis result data indicating a result of auxiliary analysis of the analysis target liquid, and it is configured to connect the liquid analysis apparatus and the external device through a network, and transmit the auxiliary analysis result data to the liquid analysis apparatus.

When the flowing analysis target liquid is analyzed, depending on the weather conditions of the first analysis site, or the like, the analysis target liquid is not stabilized to prevent obtaining an accurate analysis result, and therefore it is necessary to make a comparison with the auxiliary analysis result obtained by sampling the analysis target liquid and separately performing analysis. When doing this, since the second analysis site at which the sampled analysis target liquid is analyzed is different from the first analysis site at which the analysis target liquid flows, a user is required to move to the first analysis site and compare the auxiliary analysis result obtained at the second analysis site with an analysis result obtained at the first analysis site, and thus requires time and effort.

However, in the liquid analysis system according to the present invention, since the liquid analysis apparatus at the first analysis site and the external device at the second analysis site are connected through the network, and the auxiliary analysis result data obtained by the external device is transmitted to the liquid analysis apparatus, the user can compare analysis result data and the auxiliary analysis result data without moving to the second analysis site, and user's time and effort can be saved.

Advantageous Effects of Invention

According to the present invention, the liquid analyzer that performs analysis in a state where a responsive membrane of a sensor is immersed in a flowing analysis target liquid makes it possible to determine whether the sensor is good without taking time and effort, and increase reliability.

LIST OF REFERENCE CHARACTERS

1 Liquid analyzer
2 Ammonia sensor
3 Potassium sensor
4 Reference sensor
6 Analysis mechanism
8 Resistance measurement mechanism
10 Control part

DESCRIPTION OF EMBODIMENTS

One embodiment of the present invention will be described below with reference to drawings.

A liquid analyzer 1 in the present embodiment is a liquid analyzer 1 that is used with a sensor immersed in a flowing liquid such as a river or sewage water, and for example, an ammonia meter adapted to measure ammonia concentration in an inflow tank, effluent tank, aeration tank, or the like used for sewage treatment, or at the intake or the like of a water purification plant.

Figure 1:
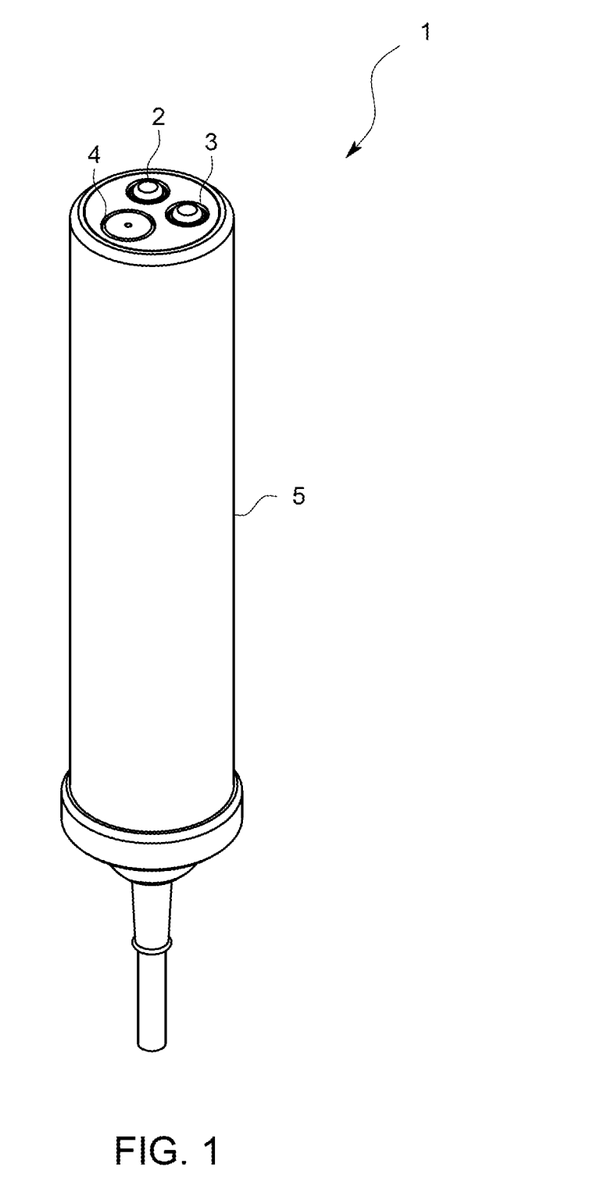
FIG. 1 is a perspective view illustrating a liquid analyzer in one embodiment of the present invention.
Figure 2:
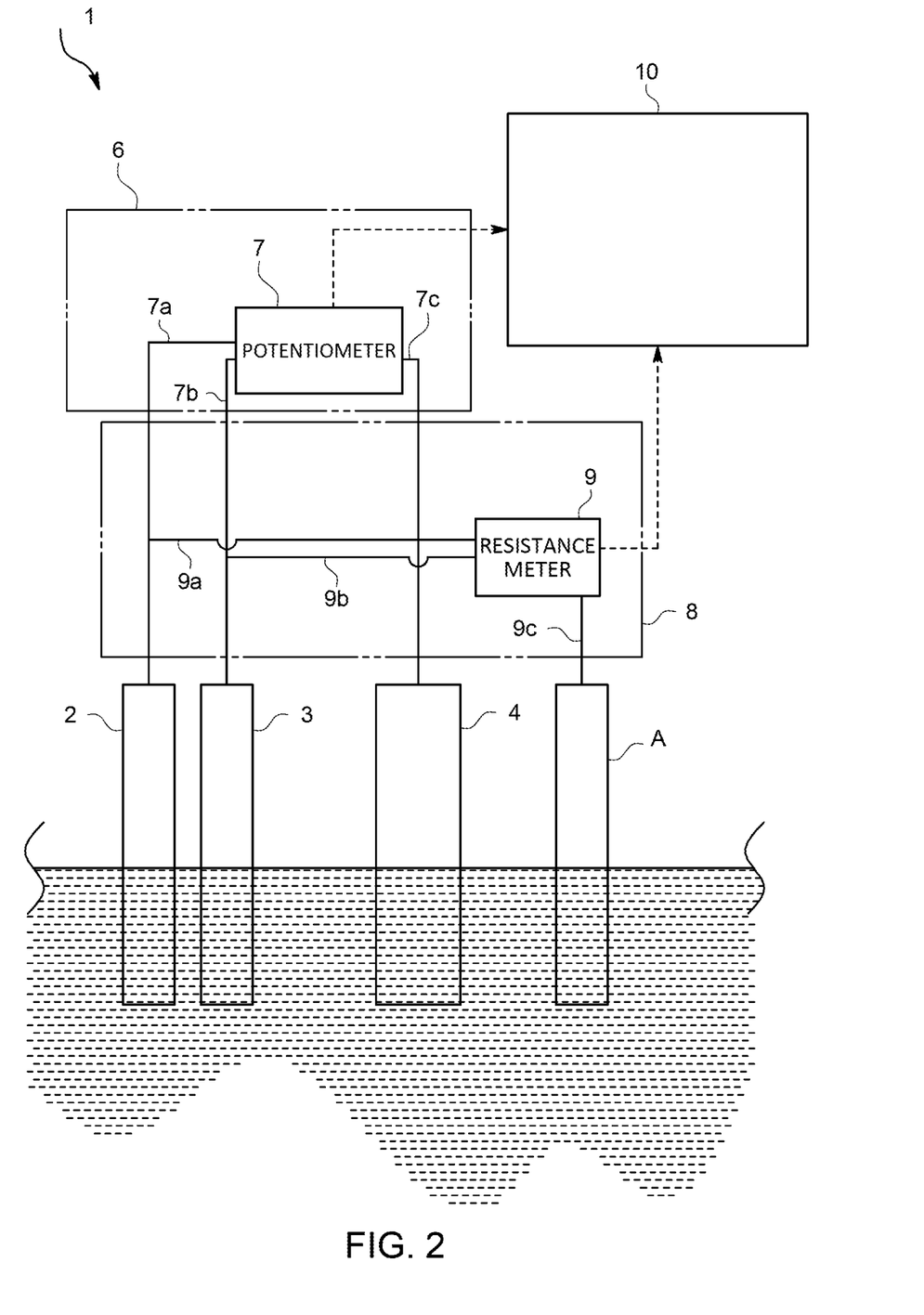
FIG. 2 is a schematic diagram illustrating the liquid analyzer in the same embodiment.

As illustrated in FIG. 1 and FIG. 2, the ammonia meter includes: an ammonia sensor 2 that senses an ammonia component contained in an analysis target liquid; a potassium sensor 3 that is used to correct the interference of potassium ions in ammonia ions; a reference sensor 4 that measures a reference potential; a container 5 containing the three sensors; and an analysis mechanism 6 adapted to analyze potential differences using these sensors.

The ammonia sensor 2 and the potassium sensor 3 each includes: a substantially cylindrically-shaped sensor body; a responsive membrane that is bonded to the fore end surface of the sensor body and reacts with a predetermined component (ammonia ions or potassium ions) contained in the analysis target liquid; a protective membrane provided so as to cover the outer circumferential surface of the responsive membrane; an internal liquid contained inside the sensor body; and an internal electrode immersed in the internal liquid.

The responsive membrane of the ammonia sensor 2 is one including: a base made of vinyl chloride; ionophores that are contained in the base and selectively react with ammonium ions; and a plasticizer that is contained in the base and for softening vinyl chloride. As the responsive membrane, one having a thickness of approximately 0.8 mm can be used.

The protective membrane is a membrane formed of, for example, fluorine-based resin, and one configured to allow the analysis target liquid to permeate therethrough to contact with the responsive membrane and on the other hand, prevent suspended substances and microorganisms in the analysis target liquid from passing therethrough.

The reference sensor 4 includes: a substantially cylindrically-shaped sensor body; a liquid communication part provided at the fore end surface of the sensor body; an internal liquid contained inside the sensor body; and an internal electrode immersed in the internal liquid.

The analysis mechanism 6 is one that as illustrated in FIG. 2, uses potentials generated in the ammonia sensor 2, potassium sensor 3, and reference sensor 4 to analyze the analysis target liquid, and includes: a potentiometer 7 that uses the potentials generated in the ammonia sensor 2, potassium sensor 3, and reference sensor 4 to measure potential differences between them; and circuits 7a, 7b, and 7c respectively connecting between the ammonia sensor 2, potassium sensor 3, and reference sensor 4, and the potentiometer 7.

In addition, a resistance measurement mechanism 8 adapted to measure the resistances of the responsive membranes of the ammonia sensor 2 and the potassium sensor 3 is provided.

The resistance measurement mechanism 8 is one that as illustrated in FIG. 2, applies DC voltage to a responsive membrane to measure the resistance of the responsive membrane, and includes: a resistance meter 9 that applies the DC voltage to the responsive membrane to measure the resistance of the responsive membrane; an electrode A that is immersed in the analysis target liquid and serves as ground for the resistance meter 9; and branched circuits 9a and 9b and a circuit 9c that are ones connecting among the resistance meter 9, the ammonia sensor 2, and the electrode A and among the resistance meter 9, the potassium sensor 3, and the electrode A and of which the branched circuits 9a and 9b are respectively branched from the circuits 7a and 7b of the analysis mechanism 6.

The resistance measurement mechanism 8 is one that applies the DC voltage between the ammonia sensor 2 and the electrode A from the resistance meter 9 through the branched circuit 9a and the circuit 9c, as well as applying the DC voltage between the potassium sensor 3 and the electrode A from the resistance meter 9 through the branched circuit 9b and the circuit 9c to measure the internal resistances of the ammonia sensor 2 and the potassium sensor 3. As the DC voltage to be applied, 10 mV to 10 V, preferably 100 mV to 5 V can be cited. Note that the internal resistance of the ammonia sensor 2 refers to electric resistance in a closed circuit including the ammonia sensor 2, resistance meter 9, and electrode A, and has almost the same value as that of the resistance of the responsive membrane of the ammonia sensor 2. Also, the internal resistance of the potassium sensor 3 refers to electric resistance in a closed circuit including the potassium sensor 3, resistance meter 9, and electrode A, and has almost the same value as that of the resistance of the responsive membrane of the potassium sensor 3. In addition, as the values of the internal resistances of the ammonia sensor 2 and the potassium sensor 3, 10 MΩ to 10 GΩ can be cited.

Further, a control part 10 adapted to control the analysis mechanism 6 and the resistance measurement mechanism 8 and also activate the resistance measurement mechanism 8 in a state of stopping the analysis mechanism 6 is provided.

Figure 3:
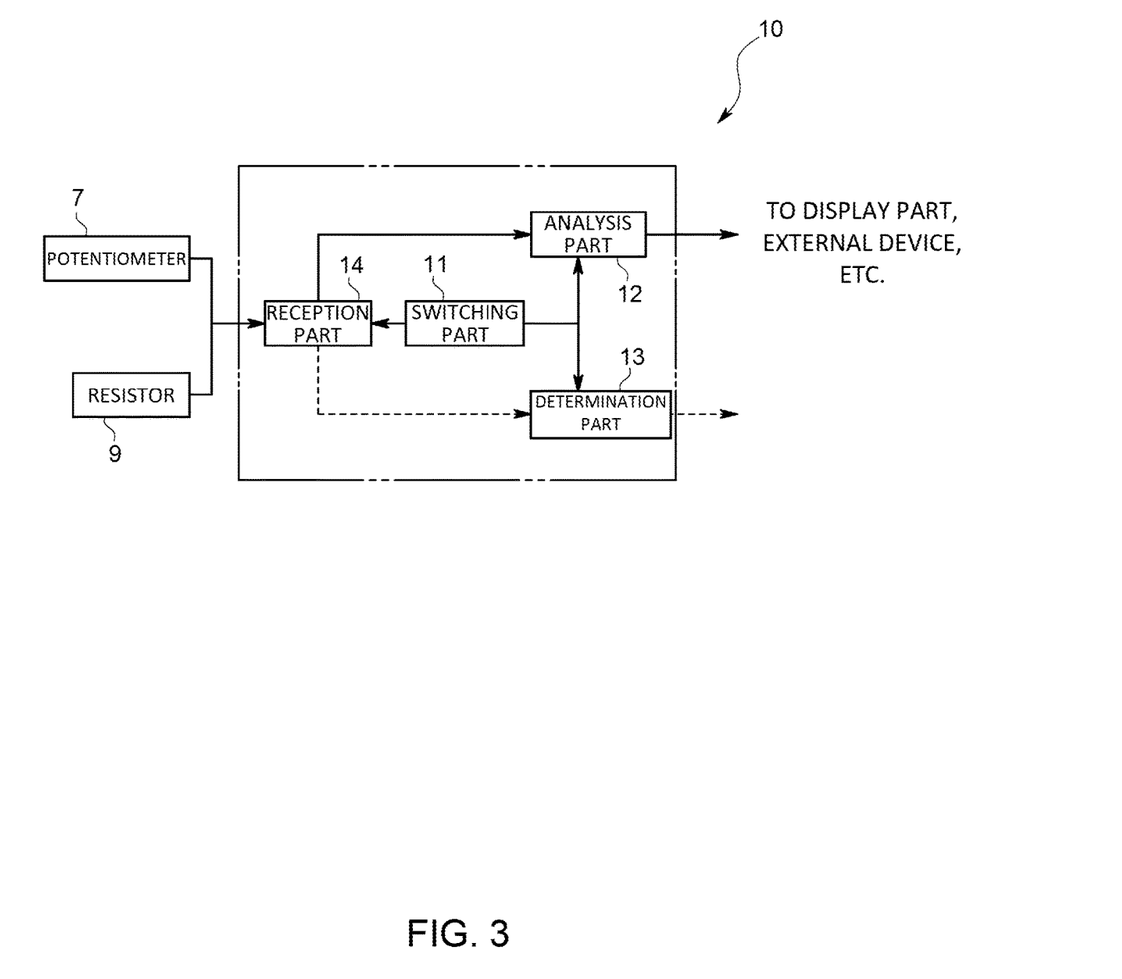
FIG. 3 is a block diagram illustrating a control part of the liquid analyzer in the same embodiment.
Figure 4:
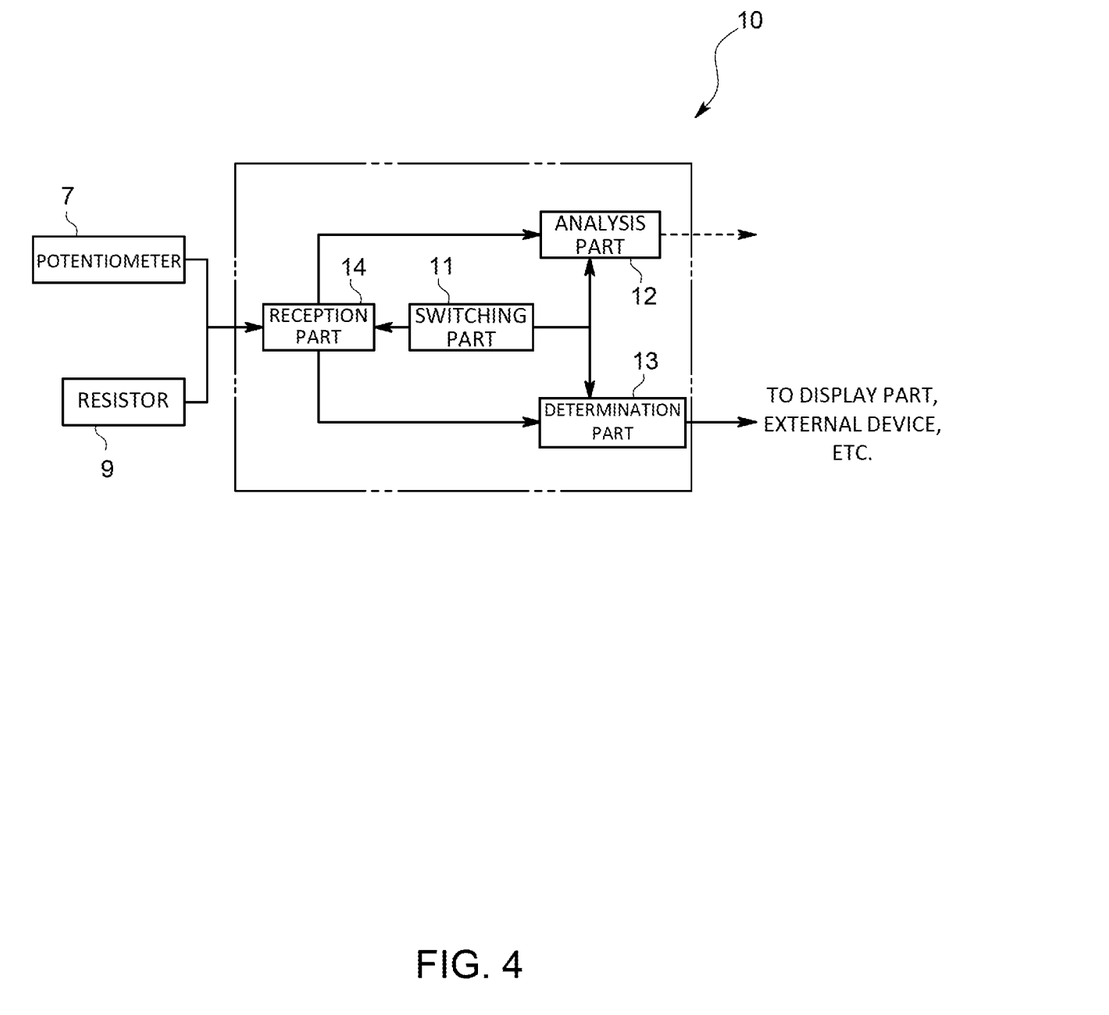
FIG. 4 is a block diagram illustrating the control part of the liquid analyzer in the same embodiment.

The control part 10 is structurally a so-called computer circuit having a CPU, an internal memory, an I/O buffer circuit, an AD converter, and the like. In addition, operating in accordance with a control program stored in a predetermined area of the internal memory allows the CPU and peripheral devices to cooperatively operate, and as illustrated in FIG. 3 and FIG. 4, the control part 10 is one fulfilling functions as a switching part 11, an analysis part 12, a determination part 13, and a reception part 14. Note that FIG. 3 illustrates a state where the resistance measurement mechanism 8 does not measure the resistance of a responsive membrane. Also, FIG. 4 illustrates a state where the resistance measurement mechanism 8 measures the resistance of a responsive membrane. In FIG. 3 and FIG. 4, dashed lines represent states where outputs from illustrated blocks are stopped or suspended, respectively and correspondingly.

The reception part 14 is one that, from the analysis mechanism 6, receives pieces of analysis result data indicating results of analysis by the analysis mechanism 6 (in the present embodiment, pieces of potential difference data indicating the potential differences acquired by the potentiometer 7), as well as receiving pieces of resistance measurement data indicating resistance measurement values measured by the resistance measurement mechanism 8 (in the present embodiment, pieces of resistance value data indicating the resistance values acquired by the resistance meter 9). In addition, the reception part 14 is one that transmits the pieces of received analysis result data to the analysis part 12, as well as transmitting the pieces of resistance measurement data to the determination part 13.

The analysis part 12 is one that acquires the pieces of analysis result data transmitted from the reception part 14 to calculate the ammonia concentration. In addition, the analysis part 12 is one that transmits concentration data indicating the ammonia concentration calculated using the pieces of analysis result data to a display part such as a display, an external device that is outside the fluid analyzer 1 and connected to the control part through a wired or wireless network, and/or the like.

The determination part 13 acquires resistance measurement data from the reception part 14, and when a corresponding resistance value is larger than a predetermined threshold value, transmits an attention signal to the unillustrated display part and/or the external device. At this time, the attention signal and time data may be linked together and then transmitted to the display part and/or the external device. Also, the determination part 13 may be one that links the resistance measurement data and time data together and then transmits them to the display part and/or the external device. In addition, in the present embodiment, the determination part 13 is configured to, when the resistance value of a responsive membrane measured by the resistance measurement mechanism 8 exceeds the predetermined threshold value, transmit the attention signal to the display part.

The threshold value is determined in the following manner.

Figure 5:
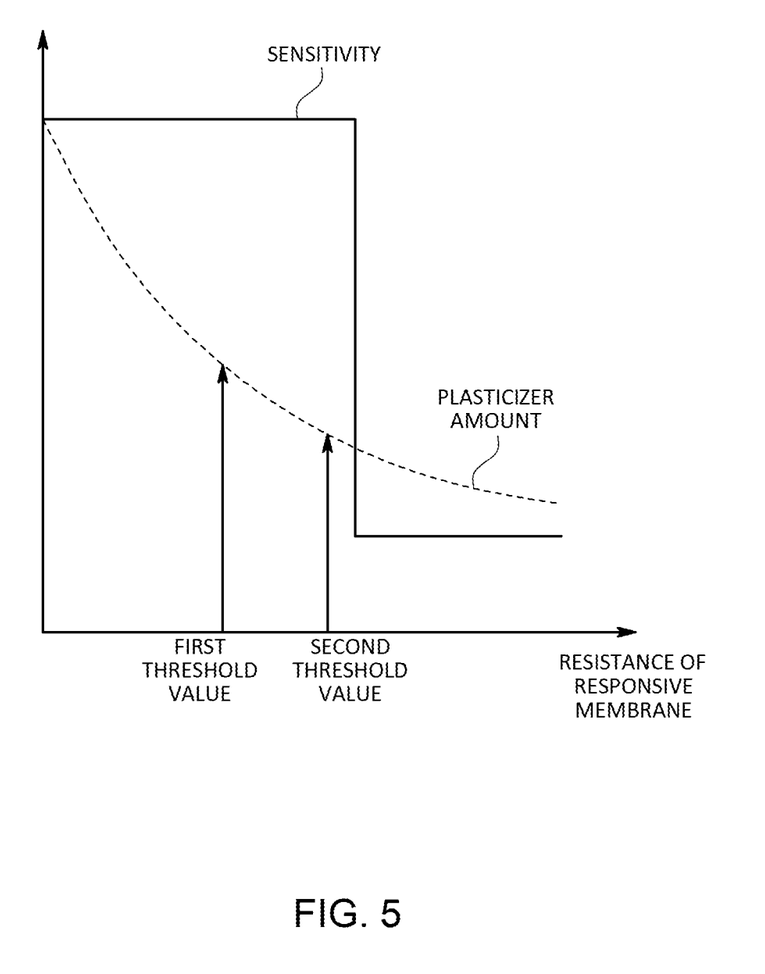
FIG. 5 is a graph illustrating the relationship between the resistance.

As illustrated in FIG. 5, there is a correlation between the resistance of a responsive membrane and the sensitivity of the liquid analyzer 1, and as the resistance of the responsive membrane increases, the sensitivity of the liquid analyzer 1 is abruptly decreased at a certain point. Also, as illustrated in FIG. 5, there is a correlation between the resistance of the responsive membrane and the amount of the plasticizer in the responsive membrane, and it turns out that as the amount of the plasticizer decreases, the resistance of the responsive membrane decreases while drawing a smoothly decreasing downward convex curve.

This may be caused by the following.

The plasticizer used for the responsive membrane of a sensor is dissolved in an aeration tank or chemically/biologically decomposed by the analysis target liquid contained in the aeration tank, and therefore in proportion to the operating time of the liquid analyzer 1, the amount of the plasticizer in the sensor gradually decreases. For this reason, it is considered that the decrease in the amount of the plasticizer causes the movement of ionophores to be restricted, and therefore the resistance value of the responsive membrane increases and the sensitivity of the liquid analyzer 1 abruptly deteriorate at a point when the resistance value reaches a constant or more.

Therefore, in the present embodiment, the resistance value of the responsive membrane at a certain decrease ratio of the amount of the plasticizer is set as the threshold value, and at a point when the resistance value of the responsive membrane measured by the resistance measurement mechanism 8 exceeds the threshold value, the determination part 13 transmits the attention signal to the display part. In doing so, since the sensitivity is abruptly decreased at a certain point, when the relationship between the resistance and sensitivity of the responsive membrane is used for the threshold value, it is difficult to set the threshold value, whereas by using the relationship between the resistance of the responsive membrane and the amount of the plasticizer to set the threshold value, the threshold value can be set with the use of a function that smoothly increases the resistance value of the responsive membrane as the amount of the plasticizer decreases.

Specifically, as illustrated in the graph of FIG. 5, the resistance value of the responsive membrane at a point when the decrease rate of the amount of the plasticizer is approximately 50% of an initial value is set as a first threshold value, and the resistance value of the responsive membrane at a point when the decrease rate is approximately 35% of the initial value is set as a second threshold value. Note that the number of the threshold values may be more than one as in the present embodiment, or one. Also, the resistance value of the responsive membrane as a threshold value can be appropriately changed.

In addition, the above-described display part and/or the external device are ones that when the concentration data is sent from the analysis part 12, display the concentration data on displays and/or the like, and when the resistance data and the time data are sent from the determination part 13, display the pieces of data as a graph with the vertical axis as the resistance of the responsive membrane and the horizontal axis as time. Further, when the attention signal is transmitted from the determination part 13, the display part and/or the external device call user's attention by displaying, for example, an icon suggesting the switching of the sensor on the displays and/or the like or ringing an alarm.

Further, when activating the resistance measurement mechanism 8, the switching part 11 activates the resistance measurement mechanism 8 to make the reception part 14 transmit the pieces of resistance measurement data to the determination part 13 in a state of keeping the pieces of analysis result data indicating the analysis results of the analysis by the analysis mechanism 6. Also, the switching part 11 acquires time data from an unillustrated clock provided in the control part 10, when a predetermined time has passed after activating the resistance measurement mechanism 8, stops the resistance measurement mechanism 8 to cancel the keeping state after a predetermined time has passed, and makes the reception part 14 transmit the pieces of analysis result data to the analysis part 12. The predetermined time after stopping the resistance measurement mechanism 8 refers to a discharge period required to discharge the DC voltages applied to the responsive membranes after the resistance measurement mechanism 8 measured the resistances of the responsive membranes.

Also, the term "keeping state" herein refers to a state where the pieces of analysis result data have been transmitted from the analysis mechanism 6 to the reception part 14, but the reception part 14 has not transmitted them to the analysis part 12, a state where the reception part 14 has transmitted the pieces of analysis result data to the analysis part 12, but the analysis part 12 has not transmitted the concentration data calculated using the pieces of analysis result data to the display part and/or the external device, or a state where the reception part 14 has transmitted the pieces of analysis result data to the analysis part 12, and when the analysis part 12 transmits the concentration data calculated using the pieces of analysis result data to the display part and/or the external device, the transmission is linked to invalid data indicating that the data is invalid and then performed.

In the present embodiment, the time from activating the analysis mechanism 6 to switching to the keeping state is set to, for example, six to eight hours. Also, the time from activating the resistance measurement mechanism 8 to stopping it is set to a few seconds to a few minutes. Further, the discharge period that is the time from stopping the resistance measurement mechanism 8 to canceling a suspended state of the analysis mechanism 6 is set to a few seconds to a few minutes. Accordingly, on a daily basis, the resistance measurement mechanism 8 is activated three to four times.

The liquid analyzer 1 in the present embodiment configured as described above has the following remarkable effects.

That is, as the responsive membranes immersed in the flowing analysis target liquid, strengthen ones as compared with a typical responsive membrane are used in order to obtain a configuration resistant to disturbance such as air bubbles, vibration, impurities, and the like in the analysis target liquid, and therefore the resistances of the responsive membranes are sufficiently large as compared with the resistance of the analysis target liquid itself. However, in the present embodiment, since the resistance measurement mechanism applies the DC voltages, even when the membrane resistances are high, i.e., even in the case of the resistances of the responsive membranes immersed in the analysis target liquid, the values of the resistances can be measured. Note that since there is the correlation between the resistance of each responsive membrane and the sensitivity of the liquid analyzer 1, by measuring the resistance of the responsive membrane, it can be determined whether the liquid analyzer 1 is good. Accordingly, only by measuring the resistance of the responsive membrane, it can be simply determined whether the liquid analyzer 1 is good.

Also, since the resistances of the responsive membranes are relatively high as described above, the resistances of the responsive membranes cannot be measured without applying the DC voltages; however, the control part 10 activates the resistance measurement mechanism 8 in the state of stopping or suspending the analysis mechanism 6, and when the predetermined time has passed after stopping the resistance measurement mechanism 8, cancel the stopped or suspended state of the analysis mechanism 6, and therefore during the predetermined time, electric charges stored in the responsive membranes can be discharged to prevent the occurrence of polarization. For this reason, without affecting the analysis by the liquid analyzer, it can be determined whether the liquid analyzer is good.

Also, when applying the DC voltages to the responsive membranes, polarization occurs and accurate analysis may be prevented at the time of the analysis of the analysis target liquid; however, the control part 10 provides the discharge period to discharge the electric charges stored in the responsive membranes after the resistance measurement mechanism 8 has measured the resistances of the responsive membranes, and therefore the DC voltages applied to the responsive membranes can be discharged to prevent the occurrence of polarization during the predetermined time.

In other words, since the control part 10 activates the resistance measurement mechanism 8 in the state of stopping the analysis mechanism 6 or keeping the pieces of analysis result data indicating the analysis results of the analysis by the analysis mechanism 6, and also when the discharge period has passed after stopping the resistance measurement mechanism 8, cancels the stop of the analysis mechanism 6 or the keeping state, when the analysis mechanism 6 performs the analysis, the effect of the voltages applied to the responsive membranes by the resistance measurement mechanism 8 can be prevented, and therefore without affecting the analysis result by the liquid analyzer 1, it can be determined whether the liquid analyzer is good.

The resistance measurement mechanism 8 measures the resistances of the responsive membranes multiple times (three to four times in the present embodiment) a day, and by determining the averages of the multiple resistance values as the resistances of the responsive membranes, an error depending on measurement time can be eliminated to ensure the determination of the deterioration of the liquid analyzer 1.

Further, since the display part continuously displays the time-dependent changes in the resistances of the responsive membranes in graph form, by viewing the graph, it can be determined whether the cause of abnormality is due to the time-dependent deterioration of a responsive membrane or, for example, due to a mistake such as failing to immerse a responsive membrane in the analysis target liquid.

Figure 6:
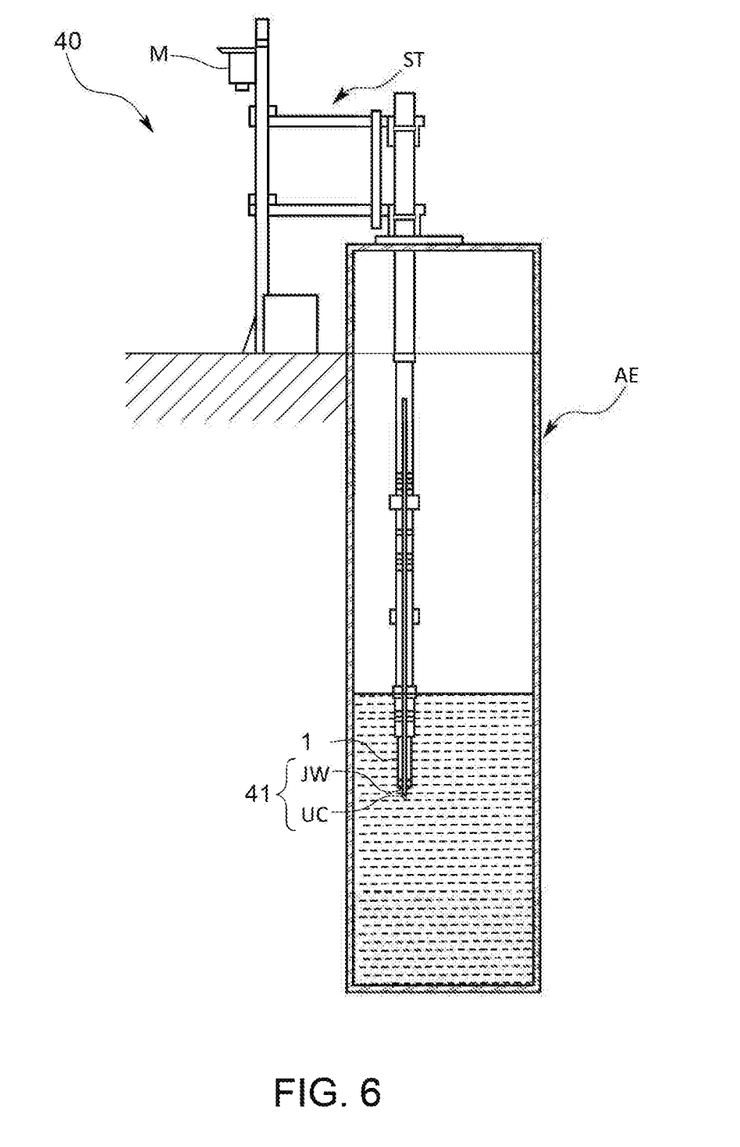
FIG. 6 is a schematic diagram illustrating a liquid analysis apparatus in an alternative embodiment of the present invention.
Figure 7:
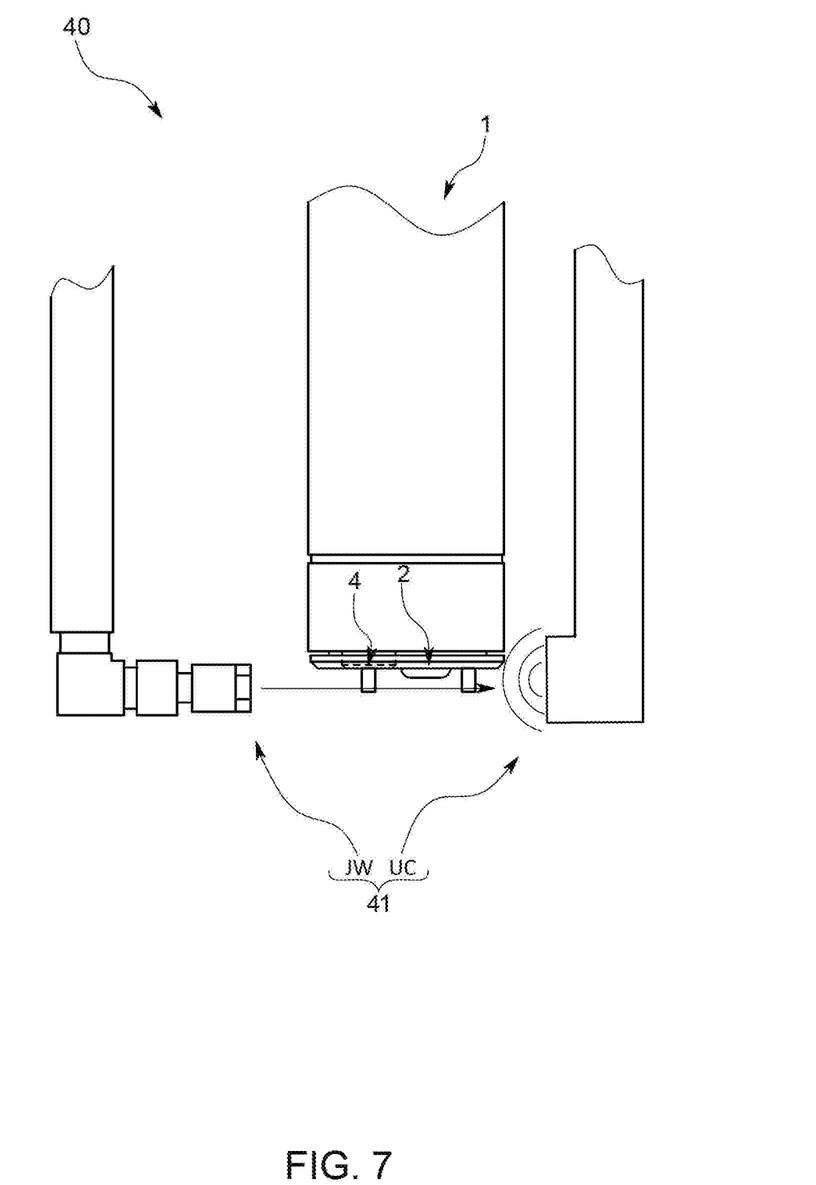
FIG. 7 is a schematic diagram illustrating the details of a cleaning mechanism in the alternative embodiment of the present invention.

Next, a liquid analysis apparatus 40 according to an alternative embodiment of the present invention will be described with reference to FIG. 6 and FIG. 7.

The liquid analysis apparatus 40 in the present embodiment further includes: the above-described ammonia meter as the liquid analyzer 1; a cleaning mechanism 41 adapted to remove dirt attached to the sensor surfaces of the respective sensors of the liquid analyzer 1; a liquid analyzer support part ST adapted to support the liquid analyzer 1 from outside the aeration tank AE so as to immerse the fore end part of the liquid analyzer 1 in the analysis target liquid; and a display part M adapted to display a measurement value calculated in the control part 10.

The details of the cleaning mechanism 41 will be described with reference to FIG. 7. As illustrated in FIG. 7 that is an enlarged view of the fore end part of the liquid analyzer 1 and the cleaning mechanism 41, the cleaning mechanism 41 is configured to include: an ultrasonic cleaner UC adapted to mainly clean the sensor surface of the ammonium ion sensor 2 and the sensor surface of the potassium ion sensor 3; and an air jet washer JW adapted to mainly clean the sensor surface of the reference electrode 4.

The ultrasonic cleaner UC is one that generates ultrasonic vibration propagating in the horizontal direction in the analysis target liquid such that the ultrasonic vibration propagates in a direction perpendicular to an axial direction of each of the sensors. The ultrasonic cleaner UC is adapted to suppress the production of biofilms in the liquid analyzer 1 by constantly and continuously generating the ultrasonic vibration in the analysis target liquid. Such a configuration makes it possible to eliminate or reduce compressional wave components propagating in the axial direction of the liquid analyzer 1 as compared with when ultrasonic vibration is generated along the axial direction of the liquid analyzer 1, and thereby large vibration caused by resonance can be prevented from occurring near the responsive membranes. Accordingly, the functions of the responsive membranes are unlikely to be impaired.

The air jet washer JW is one that in the analysis target liquid, forms a flow flowing in a direction parallel to the fore end surface of the liquid analyzer 1. More specifically, the injection part of the air jet washer JW is radially separated from the outer circumferential surface of the liquid analyzer 1 by a predetermined distance, and provided so as to form the flow flowing in the horizontal direction on the lower side of the sensor surface of the reference sensor 4.

Such a configuration makes it possible to, even when the analysis target liquid is a heavily dirty one such as sewage water, prevent the sensor surfaces of the respective sensors from being made dirty to make the generation of predetermined responses on the responsive membranes unlikely, and therefore reliable measurement can be continued over a long term.

Next, a liquid analysis system according to a still alternative embodiment of the present invention will be described with reference to FIG. 8.

Note that parts corresponding to those described in the liquid analyzer 1 or the liquid analysis apparatus 40 in each of the above-described embodiments are denoted by the same reference signs, and the description will be partially omitted.

The liquid analysis system 100 in the present embodiment includes: a liquid analysis apparatus 40 adapted to, at a first analysis site A1 at which an analysis target liquid flows, analyze the analysis target liquid in a state of being immersed in the analysis target liquid; and an auxiliary liquid analysis apparatus 30 adapted to, at a second analysis site A2 provided remotely from the first analysis site A1, analyzes the analysis target liquid sampled.

First, the auxiliary liquid analysis apparatus 30 will be described.

The auxiliary liquid analysis apparatus 30 is one that is provided at the site (the second analysis site A2) different from the first analysis site A1 at which a liquid analyzer is arranged and analyzes the analysis target liquid sampled at the first analysis site A1, and specifically, a chromatograph or the like can be cited.

The auxiliary liquid analysis apparatus 30 is provided with an external device 32 including a data acquisition part 31 adapted to acquire auxiliary analysis result data indicating a result of auxiliary analysis of the sampled analysis target liquid (in the present embodiment, ammonia concentration). Specifically, the external device 32 refers to a computer externally attached to the auxiliary liquid analysis apparatus 30, a tablet terminal connected to the auxiliary liquid analysis apparatus 30 through a wired or wireless network, or the like, and data may be acquired by user's manual input, or by receiving the auxiliary analysis result data outputted from the auxiliary liquid analysis apparatus 30.

Next, the liquid analysis apparatus 40 will be described.

The liquid analysis apparatus 40 is one including the liquid analyzer 1 described in the above embodiments and the other components. However, between the control part 10 described in the above embodiments and a control part 20 in the present embodiment, there is a difference in configuration. In the following, the details of the control part 20 in the present embodiment will be described.

Figure 8:
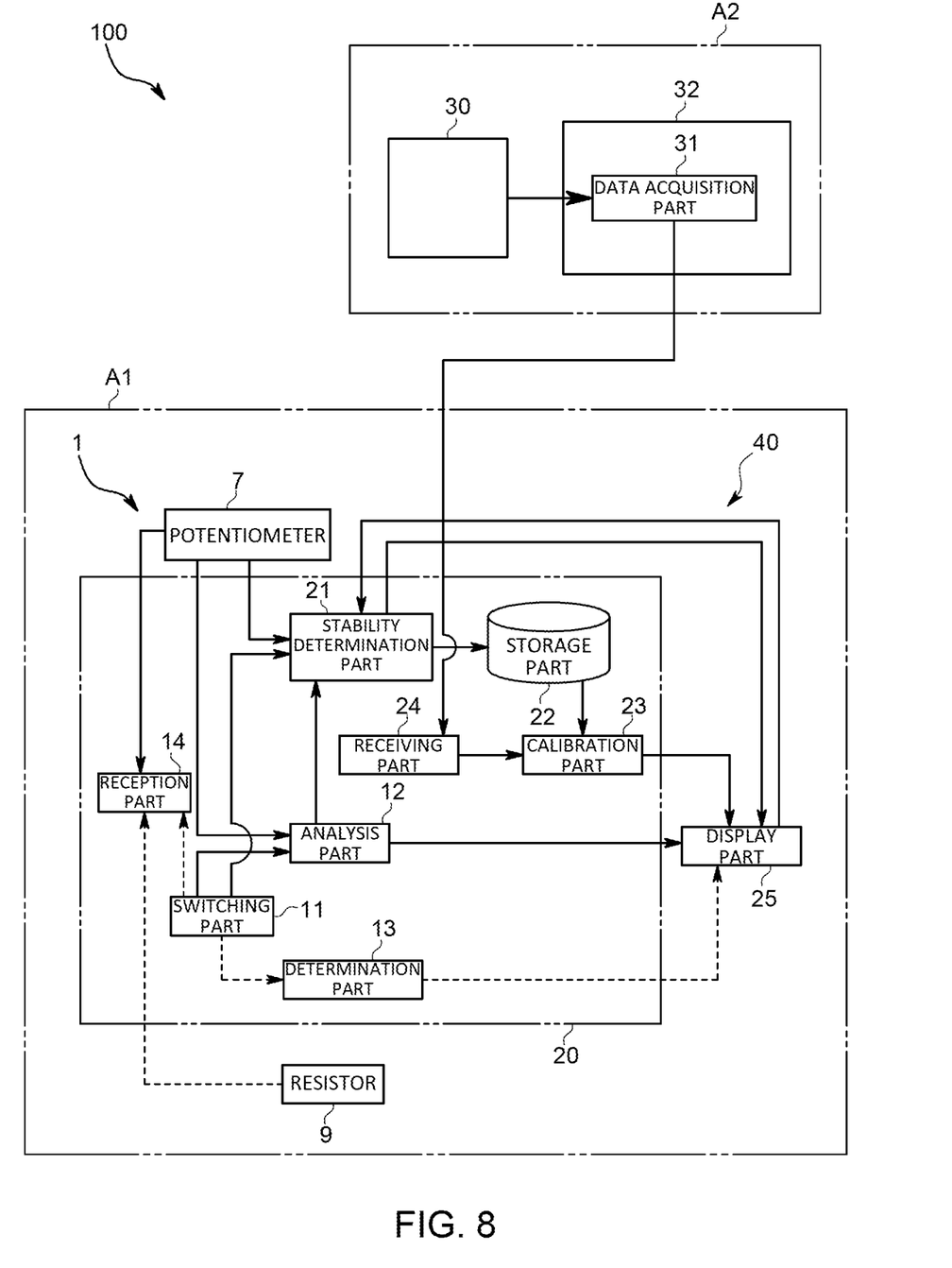
FIG. 8 is a block diagram illustrating a control part of a liquid analysis system in a still alternative embodiment of the present invention.

The control part 20 is one that as illustrated in FIG. 8, includes a function for correcting an analysis error of the analyzer 1 analyzing the flowing analysis target liquid, and specifically, newly includes a stability determination part 21, storage part 22, receiving part 24, and calibration part 23.

The stability determination part 21 receives a start signal from the switching part 11, and from the reception part, acquires analysis result data indicating the result of analysis by the analysis mechanism 6. At this time, when during a predetermined time, determining that the error among multiple pieces of analysis result data becomes a preliminarily inputted threshold value or less, the stability determination part 21 displays a calibration key on a display part 25.

Note that in the present embodiment, the predetermined time interval is 1 minute, and the threshold value is 1 mV; however, these values can be changed to user's desired values.

Then, when a user presses the calibration key displayed on the display part 25, the stability determination part 21 receives the resulting pressing data from the display part 25 to acquire concentration data indicating ammonia concentration calculated by the analysis part 12 at the time, and records the concentration data in the storage part 22. At this time, the storage part 22 overwrites and saves the newly acquired concentration data. When the overwrite save is not performed, time data may be acquired from an unillustrated clock, and the concentration data and the time data may be linked and then stored in the storage part 22.

The receiving part 24 is one connected to the data acquisition part 31 through a wireless or wired network, and receives the auxiliary analysis result data outputted from the data acquisition part 31 to transmit it to the calibration part 23.

Upon receipt of the auxiliary analysis result data from the receiving part 24, the calibration part 23 extracts the concentration data from the storage part 22. Note that when the concentration data is neither overwritten nor saved in the storage part 22, the calibration part 23 may refer to date and time data that is linked to the analysis result data and on the date and time when the analysis target liquid was sampled, and extract the concentration data from the storage part 22.

Then, the auxiliary analysis result data (concentration data) obtained by the analysis in the auxiliary liquid analysis apparatus 30 and the concentration data extracted from the storage part 22 and obtained by the analysis in the liquid analysis apparatus 40 are compared, and calibration is performed such that the concentration data extracted from the storage part 22 matches the auxiliary analysis result data obtained by the analysis in the auxiliary liquid analysis apparatus 30. It may be configured to, at this time, transmit calibration data indicating that the calibration has been finished to the display part and make the display part display on the display or the like that the calibration has been completed.

The liquid analysis system of the present embodiment configured as described above has the following remarkable effects.

That is, when the flowing analysis target liquid is analyzed, depending on the weather conditions or the like of the first analysis site A1, the analysis target liquid is not stabilized to thereby prevent obtaining an accurate analysis result, and therefore it is necessary to make a comparison with an analysis result obtained by sampling the analysis target liquid at the first analysis site A1 and separately performing analysis; however, since the liquid analyzer provided at the first analysis site A1 and the external device 32 provided at the second analysis site A2 are connected through the network, analysis result data indicating the analysis result obtained at the second analysis site A2 can be transmitted to the liquid analysis apparatus 40 provided at the first analysis site A1, and therefore user's time and effort can be saved.

The present invention is not limited to the above-described configurations.

The switching part in the above embodiments may be one adapted to bring the analysis mechanism to a stopped state. The stopped state refers to a state where the analysis mechanism stops the analysis. Also, the analysis mechanism is not limited to one configured to analyze the potential differences from the sensors, but for example, may be configured to analyze the concentration of a predetermined component in the analysis target liquid. For example, the analysis part as a component of the control part in the above-described embodiments may be configured to be included in the analysis mechanism.

In the liquid analysis system in the above embodiment, the stability determination part displays the calibration key on the display part when determining that the error among the multiple pieces of potential difference data acquired from the potentiometer becomes the preliminarily inputted threshold value or less, but may be configured to divide the threshold value into several steps, display on a monitor which threshold value the error among the potential differences decreases to, and inform a user.

In the above embodiments, as the liquid analyzer, the ammonia meter is used; however, besides it, a liquid membrane type ion electrode, a magnesium meter, calcium meter, sodium meter, potassium meter, or nitric acid meter can also be used as a liquid analyzer of the present embodiment.

The liquid analyzer of the present invention may be one further including: the determination part adapted to, in a state where multiple sensors are provided, and a responsive membrane of at least one of them is not immersed in the flowing analysis target liquid, determine whether the resistance of the responsive membrane measured by the resistance measurement mechanism is equal to or more than the predetermined threshold value; and a sensor switching mechanism adapted to, when the determination part determines that the resistance of the responsive membrane is equal to or more than the threshold value, change the sensor in the state where the responsive membrane is not immersed in the analysis target liquid into an immersed state. Such a configuration makes it possible to, when an analysis site is distant from a site at which a computer constituting part of the liquid analyzer is arrangeable, such as in the case of a sewage treatment plant, not only remotely know a reduction in the sensitivity of a sensor but remotely replace the sensor having reduced sensitivity by the sensor switching mechanism.

In addition, the liquid analyzer of the present invention may be configured such that the responsive membranes have double membrane structure, and the outer membranes are peelable. For example, when the resistance measurement mechanism senses that the resistance of a responsive membrane is in a high state, by peeling off the outer membrane, the resistance of the responsive membrane can be reduced to extend a life span. For this reason, time and effort for sensor switching or the like can be further reduced.

The present invention can be variously modified without departing from the scope thereof.

The invention claimed is:

1. A liquid analysis apparatus comprising:
   a liquid immersion-type analyzer that analyzes a flowing analysis target liquid, the liquid immersion-type analyzer comprising:
      a sensor comprising a responsive membrane and adapted to, in a state where the responsive membrane made of resin containing plasticizer is immersed in the flowing analysis target liquid such that the flowing analysis target liquid surrounds the sensor, sense a predetermined component contained in the analysis target liquid;
      a reference sensor adapted to measure a reference potential;
      an analysis mechanism having a potentiometer connected to the sensor and the reference sensor, the analysis mechanism being adapted to analyze the analysis target liquid with use of voltage difference generated between the sensor and the reference sensor;
      an electrode separately provided from the sensor and the reference sensor;
      a resistance measurement mechanism connecting to the sensor and the electrode and being adapted to, in the state where the responsive membrane of the sensor and the electrode are immersed in the flowing analysis target liquid, apply DC voltage between the responsive membrane and the electrode to measure a resistance of the responsive membrane;
   a processor operatively coupled to the resistance measurement mechanism and the analysis mechanism; and
   a cleaning mechanism adapted to remove dirt attached to a part of the sensor, the part being immersed in the analysis target liquid.

2. The liquid analysis apparatus according to claim 1, wherein
   after the resistance measurement mechanism has measured the resistance of the responsive membrane, a discharge period to discharge an electric charge supplied by the DC voltage applied to the responsive membrane is set.

3. The liquid analysis apparatus according to claim 1, wherein
   the processor is configured to control the analysis mechanism and the resistance measurement mechanism, and activates the resistance measurement mechanism in a state of stopping the analysis mechanism or keeping analysis result data indicating an analysis result of the analysis by the analysis mechanism, and when a discharge period has passed after stopping the resistance measurement mechanism, cancel the stop of the analysis mechanism or the keeping state.

4. The liquid analysis apparatus according to claim 1, wherein
   the resistance measurement mechanism measures the resistance of the responsive membrane multiple times a day.

5. The liquid analysis apparatus according to claim 1, wherein
   multiple sensors are provided, and at least one of them is in a state where the responsive membrane is not immersed in the flowing analysis target liquid, and
   the processor is further configured to determine whether the resistance of the responsive membrane is equal to or more than a predetermined threshold value, the resistance being measured by the resistance measurement mechanism; and
   the processor is further configured to, when the processor determines that the resistance of the responsive membrane is equal to or more than the threshold value, change the sensor in the state where the responsive membrane is not immersed in the analysis target liquid into an immersed state.

6. The liquid analysis apparatus according to claim 1, wherein
   the responsive membrane has double membrane structure including an outer membrane and an inner membrane, and the outer membrane is configured to be peelable.

7. The liquid analysis apparatus according to claim 1, further comprising:
   a liquid analyzer support adapted to support the liquid analyzer so as to immerse a fore end part of the liquid analyzer in the analysis target liquid; and
   a display adapted to display a measurement value outputted from the liquid immersion-type analyzer.

8. A liquid analysis system comprising:
   the liquid analysis apparatus according to claim 1, and at a first analysis site at which the analysis target liquid flows, analyzes the analysis target liquid in the state where the responsive membrane is immersed in the analysis target liquid; and
   an external device adapted to, at a second analysis site different from the first analysis site, acquire auxiliary analysis result data indicating a result of auxiliary analysis of the analysis target liquid, wherein it is configured to connect the liquid analysis apparatus and the external device through a network, and transmit the auxiliary analysis result data to the liquid analysis apparatus.

* * * * *

UNITED STATES PATENT AND TRADEMARK OFFICE
CERTIFICATE OF CORRECTION

PATENT NO.        : 10,788,447 B2
APPLICATION NO.   : 15/529001
DATED             : September 29, 2020
INVENTOR(S)       : Akio Nakayama et al.

Page 1 of 1

It is certified that error appears in the above-identified patent and that said Letters Patent is hereby corrected as shown below:

On the Title Page

In item (73), Assignees:
On Line 2, delete "(HK)" and insert --(JP)--.

Signed and Sealed this
Seventeenth Day of November, 2020

Andrei Iancu
*Director of the United States Patent and Trademark Office*